United States Patent [19]

Burton et al.

[11] 4,052,128

[45] Oct. 4, 1977

[54] METHOD OF MOVING A DOCUMENT FOR STATIONARILY EXHIBITING BOTH SIDES THEREOF

[75] Inventors: John S. Burton, Los Angeles; Ronald L. Whitney, San Fernando, both of Calif.

[73] Assignee: Terminal Data Corporation, Woodland Hills, Calif.

[21] Appl. No.: 526,491

[22] Filed: Nov. 25, 1974

Related U.S. Application Data

[63] Continuation of Ser. No. 405,354, Oct. 11, 1973, abandoned.

[51] Int. Cl.[2] .................. G03B 27/32; B65H 29/66
[52] U.S. Cl. .................................. 355/77; 271/65; 355/23; 355/76
[58] Field of Search ............ 271/DIG. 9, 65; 355/23, 355/50, 51, 75, 76, 77

[56] References Cited

U.S. PATENT DOCUMENTS 2,472,931  6/1949  Yohn .................................. 271/65 X

OTHER PUBLICATIONS

IBM T.D.B., vol. 14, No. 5, Oct. 1971, p. 1547 Dig. 9

Primary Examiner—Richard A. Wintercorn
Attorney, Agent, or Firm—Harry R. Lubcke

[57] ABSTRACT

A recorder, as for photographing original documents on microfiche, the documents selectively having information on one or both sides, which information is to be successively recorded at high speed. After initial transport by a feed belt, a first vacuum-retaining belt having document-present actuated controls moves the document to a photographing position. Thereafter this belt is reversed in direction and the document is taken from the first belt to a second vacuum-retaining belt by pneumatic force. Adhering to the second belt, the document is rotated 180°, side for side, and discharged again to the first belt. A second forward motion of the first belt returns the document to the photographing station, second side up. Further forward motion discharges the document. The images upon the fiche have the same orientation for both sides of the document for easy reading. Typically, one-sided documents are turned over, but are not photographed on the second (blank) side. An electronic logic system of the state counter type correlates the several steps of document handling.

3 Claims, 8 Drawing Figures

METHOD OF MOVING A DOCUMENT FOR STATIONARILY EXHIBITING BOTH SIDES THEREOF

This is a continuation of application Ser. No. 405,354, filed Oct. 11, 1973 now abandoned.

BACKGROUND OF THE INVENTION

This invention relates to photocopying with a machine having a flat exposure station and suited for photographing both sides of an original.

Apparatus for turning-over sheets of paper is known to the art. One apparatus drops the original into a vertical slot and then as a separate operation pulls it out again, laying the sheet on its other side at a second photographing station. Positional control of the original sheet is lost in the dropping step. As arranged in that apparatus, side A of a second original is photographed simultaneously with side B of the first original. The two adjacent photographing stations require an extremely wide-angle photographic lens to accomplish simultaneous photographing.

Another apparatus accomplishes turn-over by pneumatically flipping the bottom of the original from one roller to a contra-moving belt while the original is in a vertical position.

Still another apparatus turns the original over by plural aligned arms which rotate 180° with respect to a horizontal belt transport.

Certain other patent references disclose vacuum belt systems where the course taken by a sheet of paper depends upon which of two vacuums is created, for electro-photocopying (Xerox) both sides of a copy sheet. This is not both sides of an original document. The process includes electro-photocopying a batch of sheets on one side and subsequently the other side. Also, arrangements are disclosed where the electrostatic image or the developed image is transferred from an auxiliary roller to the second side of a sheet of paper.

BRIEF SUMMARY OF THE INVENTION

A two-sided original document is advanced by a first belt, which may use vacuum adhesion, from a prior feed belt. The document progresses to an exhibiting (or photographing) position, is stopped, and the first side is photographed or otherwise processed. The direstion of motion of the first belt is then reversed and the original is retracted from the photographing position and transferred upwardly by pneumatic means to a second belt. This belt has a large roller, around which the original passes, aided by a minor third belt to insure curvilinear travel. The second belt then discharges the now turned side-for-side original to the first belt; which, now with a forward motion, again advances the original to the photographing position, stops it, and the second side is photographed. Thereafter, a further forward movement of the first belt causes the original to fall into a receiving tray.

The document is originally positioned against a guide rail and transference from one belt to the other is controlled so that accuracy of positioning is obtained for both photographing operations.

Sensors at the photographing position and a servo circuit control a magnetic bi-directional brake-clutch system on the first belt drive to stop that belt precisely at the photographing position. This may be a bang-bang type servo circuit, but preferably a "bang-half bang" circuit according to this invention in which a tachometer controls the return.

The turn-over step can be motionally eliminated for one-sided originals; however, it is typically retained, with only the second exposure step omitted, so that all documents will face the same way in the discharge stack and machine-operator coaction may be simplified.

Digital logic, actuated by appropriate sensors defining the position of the document, controls the several mechanical elements.

DESCRIPTION OF THE PREFERRED EMBODIMENTS

Figure 1:
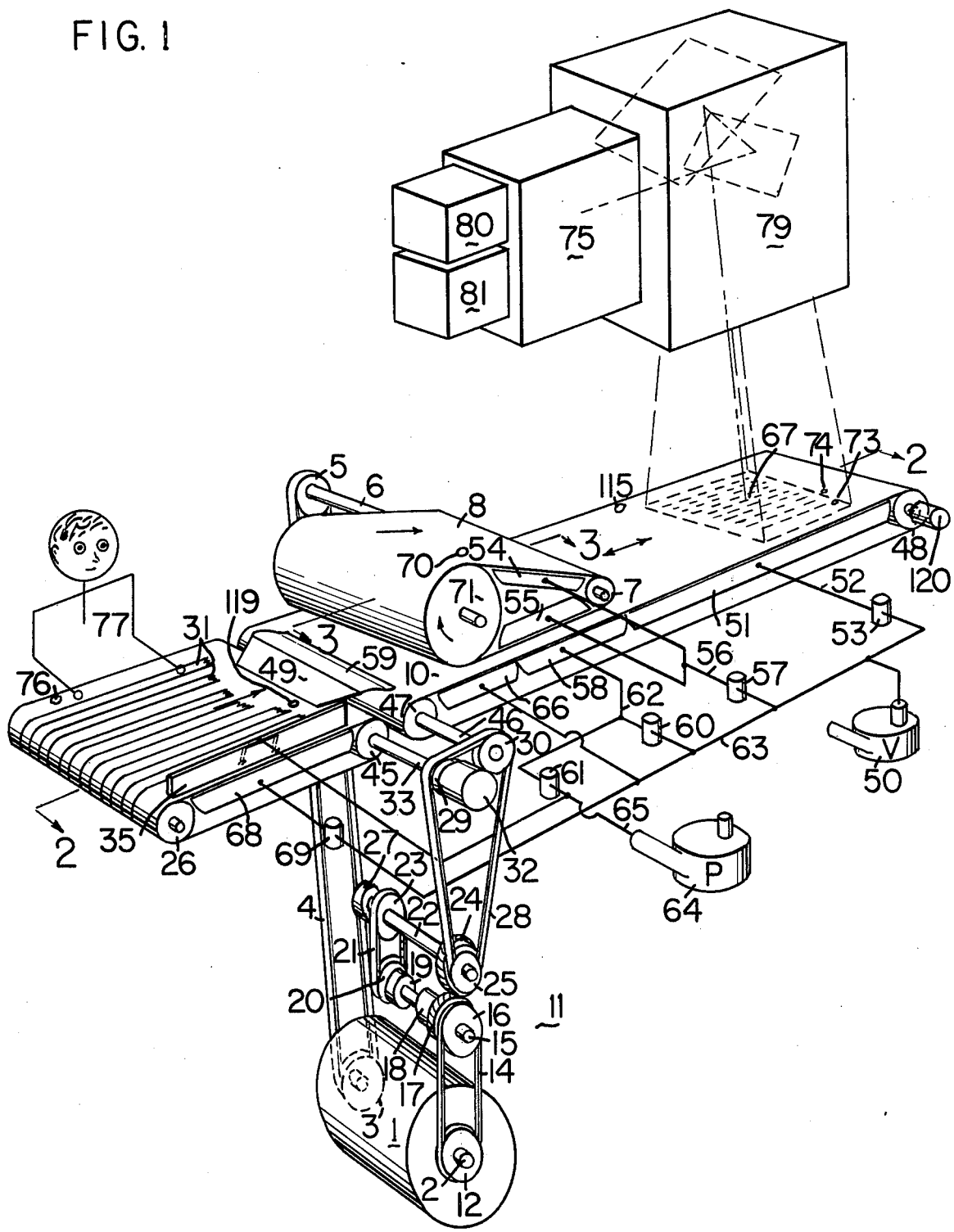
FIG. 1 is a simplified mechanical schematic view of the document recorder in perspective.

In FIG. 1, motor 1 is the prime mover of the document-handling apparatus. It may be fractional horsepower 1750 rpm induction motor having double-ended shaft 2. At the rear end of this shaft a pulley 3 (dotted) engages preferably V belt 4, which runs directly to pulley 5 of shaft 6 of small roller 7 of second belt 8. Motor 1 and the above described mechanism rotates constantly as long as the whole machine is in operation.

First belt 10 is to be started, stopped and reversed in its direction of motion in order to properly present the original documents to the photographing station. Accordingly, a forward-reverse mechanism generally indicated by 11 is connected for actuation by motor 1 via pulley 12 and belt 14.

Mechanism 11 provides forward motion by means of a toothed belt and backward motion by means of two meshing gears, with clutches associated with each.

Shaft 15 surmounts the motor. Since FIG. 1 is mechanically schematic, no bearings or supports are shown for this shaft, nor for any of the other rotating elements of the whole recorder. The bearings may be of conventional nature, of which ball-bearings supported by a frame structure are an example.

Shaft 15 supports pulley 16 at its forward end, to accept the drive from belt 14. Next in line toward the rear is lower helical gear 17, reversing magnetic clutch 18, forward magntic clutch 19, forward lower pulley 20, and forward toothed belt 21.

An upper shaft 22 supports forward upper pulley 23, upper helical reverse gear 24, and an output drive pulley 25.

Herein preferred embodiments of elements will be set forth. Equivalent elements may often be employed; as flat belts or chains for V belts or toothed belts, spur gears for helical gears, various types of clutch means, and alternate physical arrangement of clutches, brakes and/or belts to accomplish the result set forth.

Figure 8:
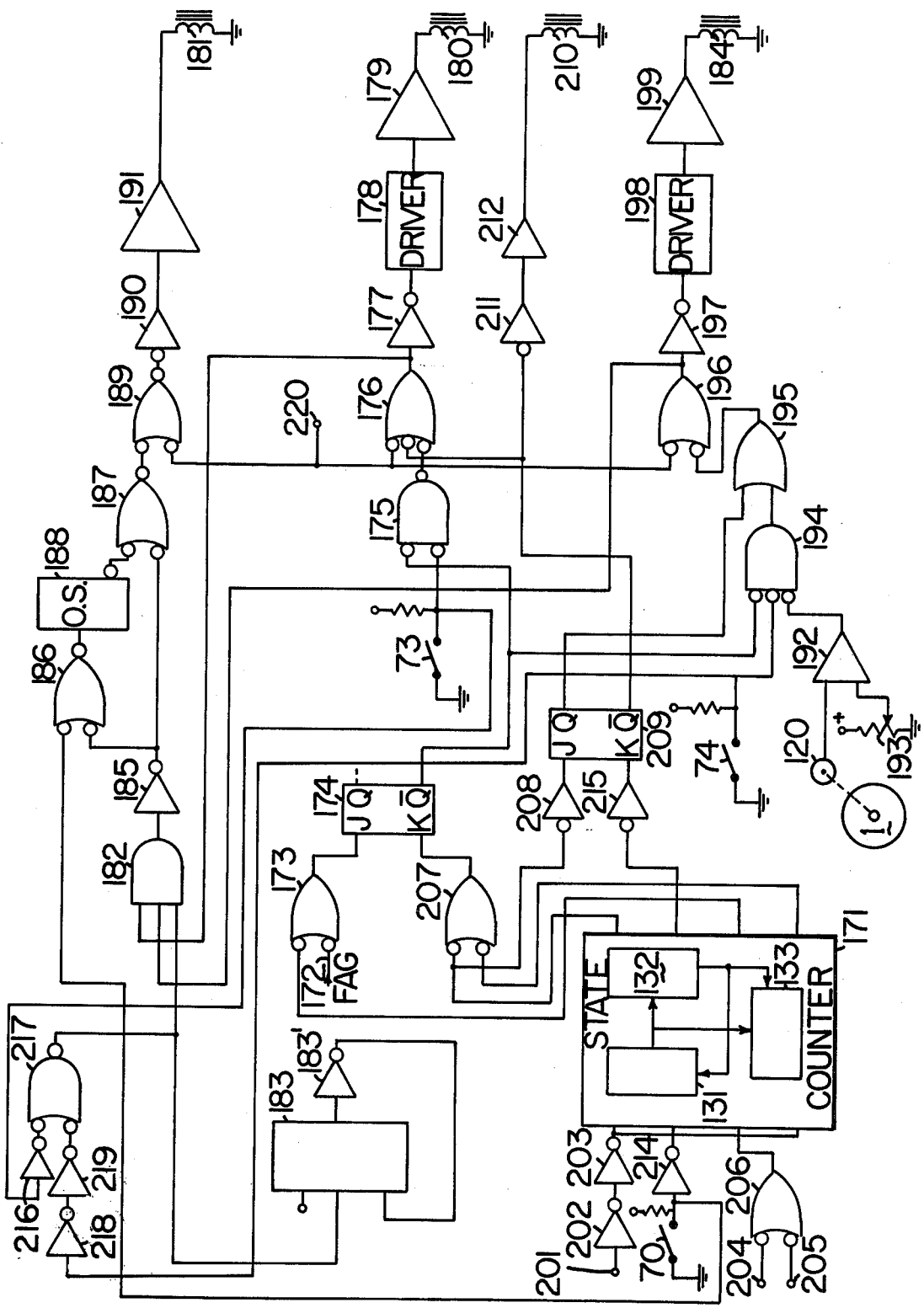
FIG. 8 is a diagram of the electronic logic control circuits for moving the documents upon the main transport.

When forward motion of first belt 10 is desired, as from left to right in FIG. 1, magnetic clutch 19 is electrically energized under the control of electronic logic shown in FIG. 8. Conversely, when belt 10 is to be reversed, magnetic clutch 19 is deenergized and clutch 18 is energized. Magnetic brake 27 insures a rapid stop and hold of belt 10. Each of these clutches has one side attached to shaft 15 and the other side to pulley 20 or gear 17, respectively; which latter two elements are otherwise a running fit upon the shaft. The brake is similarly connected to the frame and to the shaft.

Other configurations of forward-reverse-braking mechanism 11 may be used, based on the reverse of direction of rotation between two meshing gears, or the equivalent; and which is responsive within milliseconds.

Figure 4:
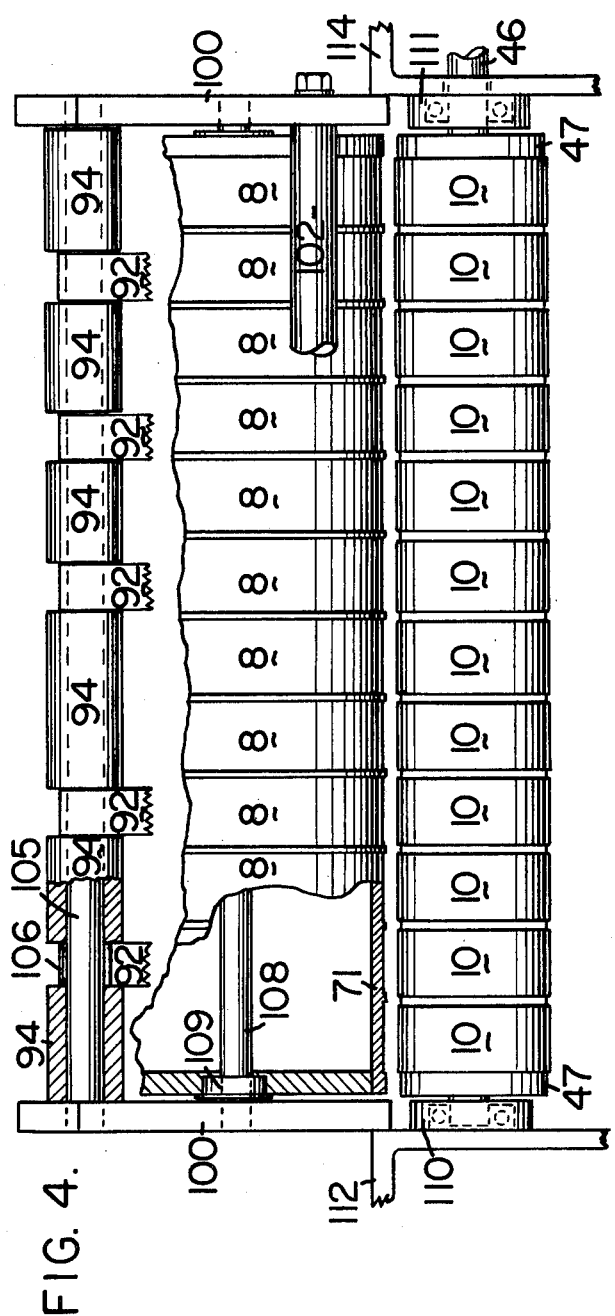
FIG. 4 is an end elevation of the same, partly broken away for clarity, and including the first (main transport) belt below.

Power from drive pulley 25 is taken by belt 28, which also runs over initial belt pulley 29 and first belt pulley 30. Initial belt 31 of the feed table operates intermittently, upon rollers 26 and 45, and only when first belt 10 is in the forward mode. Thus, a single drive that at some times does reverse may be used. Alternately, two belts 28 may be used; one to pulley 29 and the other to pulley 30 to reduce the inertia of the drive for belt 10. This belt and belt 8 are each preferably composed of a plurality of belts, as fragmentarily shown for sake of clarity in FIG. 1 only for belt 31. The plurality of belts for 8 and 10 is shown in FIG. 4.

Pulley 29 is attached to magnetic clutch-brake 32, the other coupling of which is fastened to initial belt drive shaft 33.

As will be detailed later, two pressure switches 39 and/or 44 having orifices - apertures 40, 41; 37, 38, respectively are made when the document has been correctly positioned on the feed table by the operator. Magnetic clutch 32 is then energized by the logic and belt 31 quickly translates the document to the right in FIG. 1. As soon as apertures 37 and 38 are uncovered, and after an appropriate time delay measured in milliseconds and provided by the electronic logic, the clutch part of element 32 is deenergized and the brake part 32' is energized.

This results in belt 31 being stationary for document loading by the operator at all times save when an already loaded document is whisked away to belt 10. In making this transition, trapezoidal plate 49 acts to flatten possible "dog-ears" at the corners of documents. The plate is supported about ⅛ above the junction of belts 31 and 10, and has a light, flexible cantilever leaf spring 59 that lightly presses upon belt 10.

First belt pulley 30 is attached to shaft 46, which also carries first belt roller 47. This system takes mechanical drive from forward-reverse mechanism 11, which exists for the necessary manipulation of this belt. A second belt roller 48 is free-running and is located at the output end of the whole document recorder, with belt 10 tightly stretched between the two. A typical speed of translation is 100 inches per second.

Adherence of the document to the belts is typically accomplished by a vacuum-created downdraft between the individual plural belts, or through perforated belts. Otherwise stated, pressure by the atmosphere forces the document down upon the belt in view of the reduced pressure beneath it.

A source of vaccum, such as a centrifugal rotary type blower, capable of producing a vaccuum of the order of five inches of water, is element 50 in FIG. 1. This is connected to various plenums under the various belts by a system of hollow tubes or pipes. These have been shown as simple solid lines in FIG. 1 in accordance with the schematic nature of this figure.

Plenum 51 is under the photographing station of belt 10, extending from roller 7 of belt 8 to roller 38 of belt 10, having a width approximately equal to the width of the belt, and a shallow depth, of the nature of a tray. It is connected to vacuum source 50 by pipe 52, through valve 53, which may be of the solenoid type for control by electronic logic circuits.

Upper plenum 54, being below the top side of belt 8 and lower plenum 55, being above the lower side of belt 8, are similarly connected to vacuum source 50 by pipe 56 and valve 57.

Plenum 58, next to the left from plenum 51 and under belt 10, has a dual role to play. Vacuum or pressure is supplied upon proper logic command, through typically a two-way valve shown as 60 and 61. These are normally open and normally closed, respectively. Valve 60 connects to vacuum source 50 via pipe 63; while valve 61 connects to pressure source 64. The latter is typically a rotary blower. The connecting pipe therefrom is 65.

The logic holds valve 60 deenergized and open for such times as belt 10 is moving forward and feeding a document to photographing position 67. When the document is to be turned-over, belt 10 is moving in the reverse direction, valve 60 is closed and valve 61 is opened. This supplies air pressure at plenum 58 and lifts the document to the underside of belt 8. Blower 64 supplies a pressure of about three inches of water.

Plenum 66 has vacuum from vacuum blower 50 continuously applied when the machine is operating. The vaccum to plenums 54 and 55 is controlled by valve 57 and vaccum is present only during the reversing cycle.

The vacuum associated with belt 8, the geometrical arrangement of that belt with respect to belt 10, and the pressure in plenum 58, accurately handle the documents in the turn-over step. The photograph of the second side of the document matches the position of the photograph of the first side. Skew is prevented because the tail end of the document is transferred from belt 10 to belt 8 while the front end is still held down on belt 10.

Valve 53, which is normally open during automatic operation, is only used for manually placing the documents at photographing station 67. It is controlled by the operator with a foot switch (not shown). For such manual placement operator 77 takes a position at photographing station 67.

Plenum 68 is below initial feed belt 31 and it is connected to vacuum line 63 through valve 69, also normally closed. At the same time that the sensor comprised of apertures 37 and 38 in combination with switch 39 (see FIG. 5) detects a document in proper feeding position, and before belt 31 starts to move, valve 69 is initially opened by the logic control and vacuum in plenum 68 holds the document down against the belt. Actually, this step occurs at once and the motion of the belt occurs after a short time delay. This allows the operator's fingers to be removed from contact with the document, insuring that the machine-imposed proper orientation of the document will be maintained. Another condition imposed by the logic is to inhibit the movement of belt 31 until prior processing within the machine has progressed to where a new document can be accepted for first-side photographing. Frequently this inhibition is of very short duration, or non-existent, because of the speed of processing of the machine. The normal situation calls for speed on the part of the operator to properly feed the documents.

Figure 5:
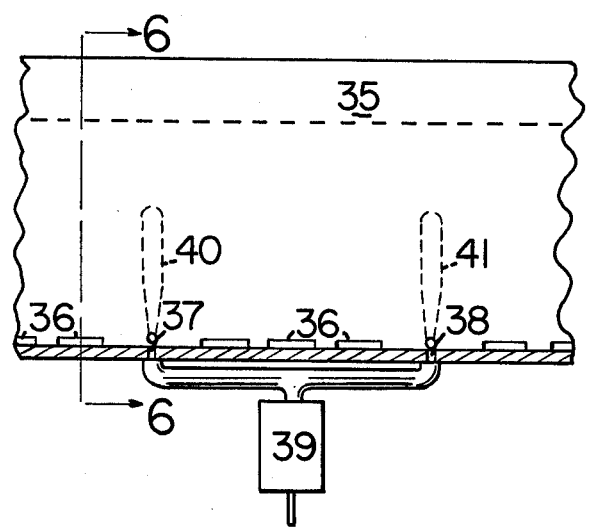
FIG. 5 is a fragmentary side elevation view of the adjustable alignment fence employed at the feeding station to initially align the documents, partly in section along line 5—5 in FIG. 6.
Figure 6:
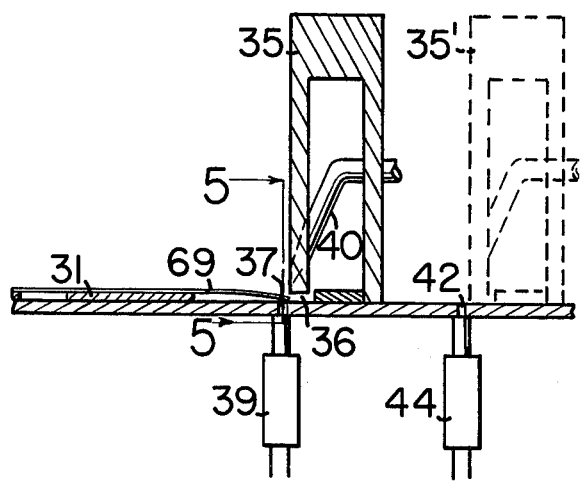
FIG. 6 is a fragmentary end elevation view of the same, showing a second adjustment position in dotted lines, partly in section along line 6—6.

The arrangement for accepting documents into the machine and to insure the correct alignment thereof is illustrated in FIGS. 5 and 6.

Alignment fence 35 is shown opposite operator 77 in FIG. 1. With feed by an operator each document is placed against the fence by the operator. When properly aligned the machine automatically takes the document away through the transport mechanism.

In FIG. 6 fence 35 is shown in full lines for a given length of document 69, say 11 inches. The operator places the document evenly along the fence and directly against it, over belts 31. As seen in FIG. 5 there are two small orifices spaced considerably apart, such as 3 inches. Air pressure from blower 64, FIG. 1, emerges from these orifices, being conducted through tubes 40 and 41, FIG. 5, and connecting to pipe 65, FIG. 1.

Directly below each orifice is an aperture 37 and 38. These connect through T tubing to pressure switch 39. When the document fully obscures both apertures the pressure switch closes and the logic gives the command to translate belts 31.

When the fence is in the dotted position 35', say for a 13 inch length of document, the pressure orifices travel with the fence, being structurally inherent therein. However, the pneumatic action is with another pair of apertures, as 42, and pressure switch 44 is actuated when the document is in the correct position.

The bottom edge of fence 35, where it meets the table surface carrying belts 31 is provided with a number of elongated narrow horizontal apertures 36. The fence is closed hollow rectangular structure and has a connection to the general vacuum system of the machine; i.e., element 50. A constant air flow into apertures 36 thus pulls the document paper down flat to the surface of the table, removing ripples and possible dog-ears in the paper, if present.

Photographing may be accomplished by microfiche camera 75, having supply and takeup magazines 80 and 81. This camera may be the one disclosed in the coinventor Burton et U.S. Pat. No. 3,601,487, granted to the same assignee on Aug. 24, 1971; or it may be a 16 mm or 35 mm microfilm camera, used alone or in conjunction with the microfiche camera.

Mirror box 79 alters the initially vertical orientation of the optical path from photographing station 67 to the horizontal orientation of the camera.

In a manner somewhat similar to the action of sensors-apertures 37 and 38, vacuum aperture-sensors 73 and 74 act to correctly position the document in a consistent position for photographing. The document rapidly approaches sensors 73 and 74, having a typical belt speed of 100 inches per second. The belt and document cannot be prevented from overshooting the exact photographing position. When the document first crosses sensor 73, forward clutch 19 is deenergized and brake 27 is energized. As the document continues its forward movement it crosses sensor 74. At this point reverse clutch 18 is energized to double its usual torque by a pulse technique, to rapidly stop the belt. and so also the document.

As the document starts to return to sensor 74, having overshot it, tachometer 120 takes control and limits the return speed of the belt to perhaps 10 to 20 inches per second. Thus, when the head end of the document uncovers sensor 74 reverse clutch 18 is deenergized. Brake 27 is still energized, and the head end of the document is stopped between sensors 73 and 74.

In contrast to an alternate mode of positioning the document from exclusively the approach side of the desired photographing position, the mode of this invention has the advantage of having the simplest logic associated with it.

As used above, clutch 18 overcomes the torque of brake 27 by having twice the torque of the brake. This mode of operation is employed in order to rapidly establish the "dead" position between sensors 73 and 74. When this position is nearly reached a braking effect is required. With available fast rise time brakes the brake may be initially pulsed "on", then "off" until the document reaches the dead zone, then turned "on" again.

Sensor-aperture 70, FIG. 1, is located adjacent to large roller 71 of document turn-over belts 8. It initiates certain additional manipulations when a document is present at the aperture. This actuates vacuum switch 70, FIG. 8. Through the logic, clutch 32 is energized and brake 29 is deenergized. This causes a document to be fed from the feed table, from belt 31 to belt 10, as the head end of the document being turned over covers aperture 70.

As the previous document heads for the stopping point at photographing station 67, the second document, which is on its first side, is "parked" underneath the page-turner assembly characterized by belts 8.

In operation, if operator 77 has not been able to place a document against alignment fence 35, and the time delay which allows the fingers to be removed has not occurred, the machine will not start the feed table belt 31, as intentionally provided by the functioning of the logic involved. The second side of the document, now turned over, will continue down to stopping sensors 73 and 74, coming to rest in the "dead" zone between the two, and photographing thereof will take place by means of additional logic provided to actuate camera 75.

In effect, thereafter, the logic again interrogates sensors 37 and 38 as to the presence of a properly oriented document. If the answer is "yes," the machine takes the document and moves it directly via belts 10 to sensors 73 and 74 at the photographing station position.

Should there still not be a properly aligned document at the feed station, then the machine just stops and waits until the operator accomplishes this operation. In this case it is necessary for the operator to push start botton 76 to activate the feed and subsequent operations.

Figure 2:
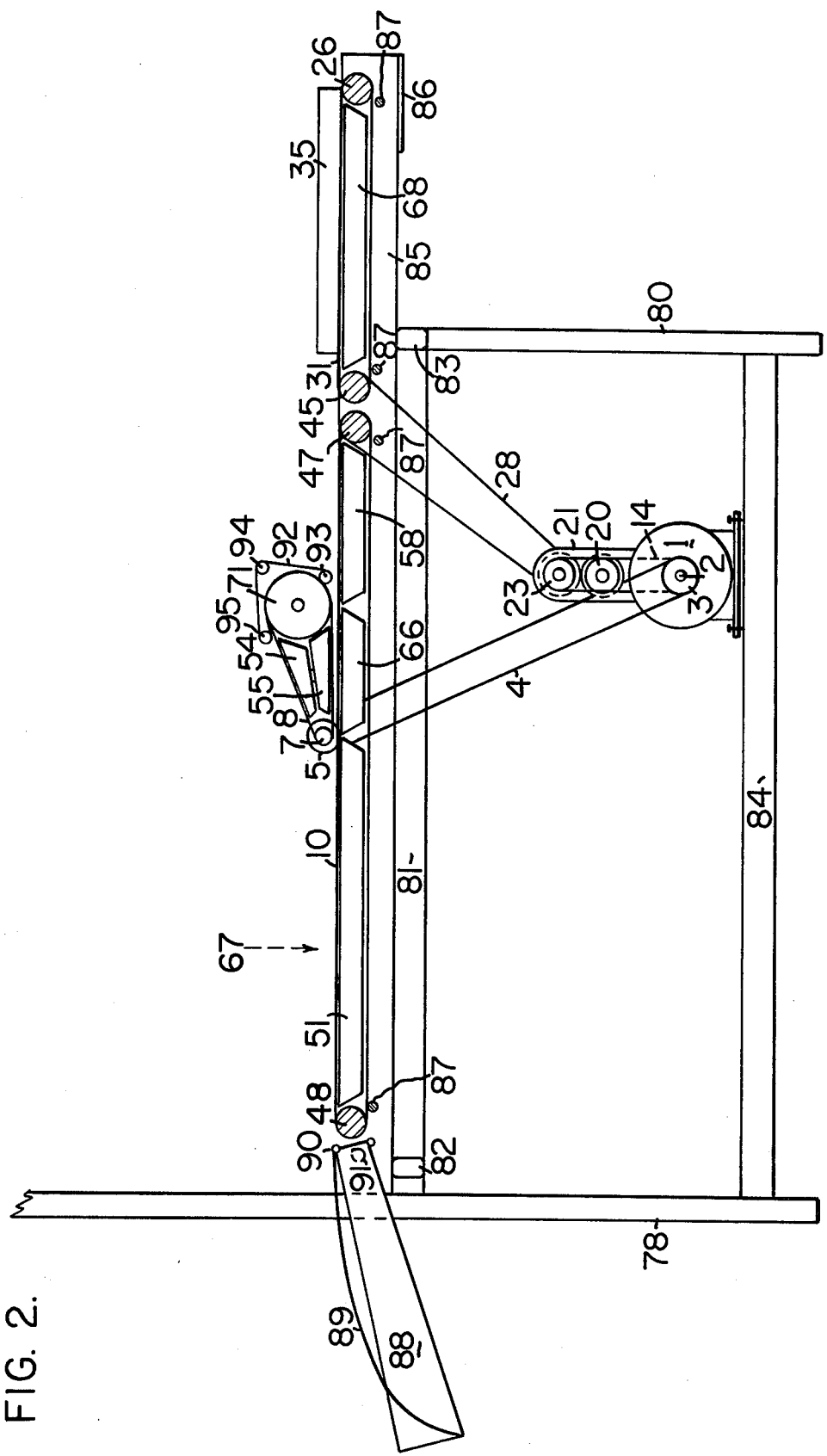
FIG. 2 is a side elevation view of the same, essentially in section taken down the middle of the whole document recorder, as indicated in FIG. 1 along line 2—2.

The view of FIG. 2 is taken from the operator 77 side of FIG. 1 and is essentially sectional down the middle of the whole document recorder. Left to right is reversed, with the operator loading station now at the right.

Certain elements previously described in connection with FIG. 1 are shown in FIG. 2 with the same reference numerals. Certain other elements are shown in FIG. 2 which were omitted from FIG. 1 for sake of clarity and vice versa, particularly as to the pneumatic system.

In FIG. 2 a rectangular supporting frame is shown, typically formed of steel angle and hollow tubing. Vertical steel angle 78 is illustrative of two such elements which extend from the floor to a superstructure that supports the camera assembly, 75 and 79 to 81 of FIG. 1 (not shown in FIG. 2). Four vertical elements which reach the floor may be provided with casters to allow the whole document recorder to be wheeled around, if required.

The machine may be constructed in various sizes. A typical embodiment has an overall height to the top of housing 79 of 72 inches and an overall lenght of 84 inches.

Vertical angle 80 supports the end of the main structure opposite to angle 78 and is typically spaced 54 inches therefrom. Rectangular tubing elements 81, 82, 83, etc. constitute an upper frame for forming the whole frame into a rigid body. These elements are typically welded together. Similarly, a lower support frame, 84, etc., and accompanying cross-plates form the lower supports, including that for motor 1, vacuum source 50 and blower 64 of FIG. 1.

The major belt structure, 31, 10, is supported by rectangular frame 85. Certain cross pieces, as plate 86 and tie rods 87 form this frame into a rigid structure.

A document receiving tray 88 is attached to frame 85 at the far end of belt 10 in a downwardly inclined manner to catch the previously photographed originals as they are ejected from the machine at a considerable velocity.

This document transport system is capable of handling documents of at least two sizes, intermixed, such as 8½ inches × 11 inches and 11 inches × 17 inches. Thus, it is not possible to move an end stop to stop the shorter documents in an even pile.

Accordingly, a plurality of wires 89, such as four, each having a diameter of the order of 1/16 inches, are arranged in an arched configuration over receiving tray 88. A hinge 90 is at the initial end to allow the wires to ride upward upon the pile of documents as these accumulate.

Below hinge 90 and beyond roller 48 is air-pressure tube 91, extending transversely across the document path. One set of orifices is positioned at the top of the tube, as four jets 1/16 inches diameter, while a second set is positioned slightly above the horizontal point on the circumference of the tube in a direction toward the center of the length of the tray. With a nominal pressure of 5 inches of water these jets keep the documents up against the under side of wires 89. With this arrangement either size document progresses to the left in FIG. 2 until it comes to rest at the left end of the tray.

Second belt 8 is shown surrounding small drive roller 7 and large roller 71. The sizes of these rollers are arranged so that the turned document, progressing downwardly upon the inclined portion of belt 8 at an angle of 25° or less, as 20°. This configuration assists in maintaining positional control of the document throughout its travel within the recorder. This is a significant feature of the invention.

Large roller 71, say of 4 inches diameter, is of relatively large diameter so that stiff documents, perhaps of thin cardboard, will bend around this roller. This operation is aided by auxiliary belt 92, which bears upon belt 8 as it passes around approximately half of the circumference of roller 71. Blanking out any tendency for the document to leave the large roller, belts 92 (note FIG. 4) are held in place by three sets of rollers of small diameter, 93, 94, 95.

The first and last roller cause the belt to bear upon belt 8. Roller 94 is spaced from that belt and provides a return path for belt 92; which belt is driven by friction from belt 8.

If a document is to be turned-over it approaches belt 8 from left to right in FIG. 2 after having been at photographing station 67. Additionally, it is often desired to turn all of the documents over, whether a photograph is taken of the second side or not, so that all will lie in filing order, face down, in the discharge tray.

The electronic control logic of FIG. 8, having initiated this movement, energizes two-way valve 60, 61. This removes the vacuum and applies air pressure to feed plenum 58. There thus exists a force tending to blow the document upward when this plenum is reached by the returning document. Plenum 55, directly above and coactive with belt 8 is now supplied with vaccum from valve 57. Thus, there is an additional force acting to draw the document upward and to cause it to adhere to belt 8.

The document then passes between belts 8 and 92 and makes the turn-over around large roller 71. Thereafter it passes down the top incline of belt 8, being retained by the vacuum in plenum 54.

When the forward edge of the document passes over sensor 70 the electronic logic of FIG. 8 changes the direction of motion of belt 10 from reverse to forward. This is accomplished by deenergizing reverse clutch 18 in FIG. 1, making the gear drive ineffective and energizing forward clutch 19.

Vacuum is always effective in plenum 51 when the machine is in the automatic feed mode, and so a transition is made from the inclined portion of belt 8 back to belt 10. The separation between these two belts is small. The last part of a document is still retained by belt 8 while the first part is being engaged by the vacuum from plenum 51 and belt 10.

This transition retains the desired orientation originally established by the operator at the feed station (belts 31) and verified by sensors 37 and 38. This is still true even though the document may be narrow in the along-the-belt dimension, as five inches for a three by five card, rather than 8½ inches for an 8½ × 11 inch sheet of usual size.

It is seen that this mode of document handling is secure, in contrast with prior turn-over mechanisms, which either drop the document in a vertical trough, lift it with fingers, or interpose a similar orientation-losing step.

Figure 3:
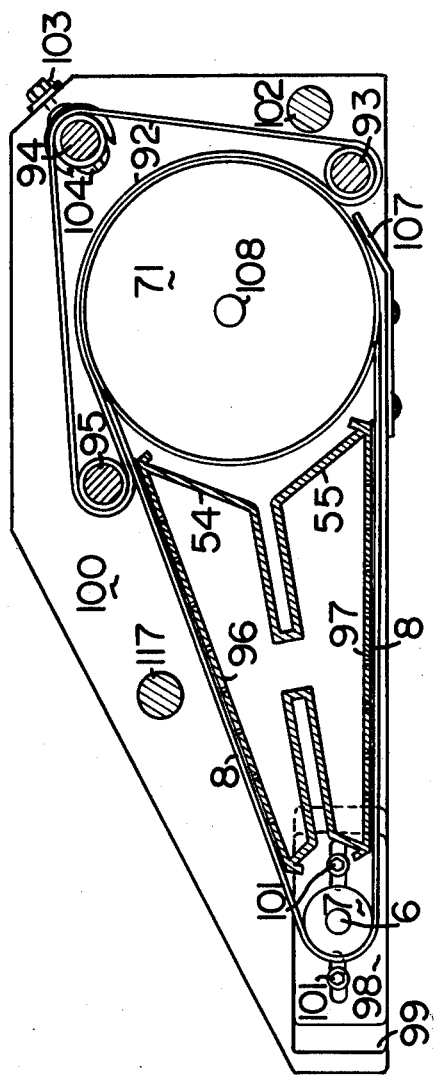
FIG. 3 is a side elevation of the document turn-over mechanism, in section along line 3—3 in FIG. 1.

An enlarged view of the document turn-over mchanism is given in section, except for rollers 7 and 71, in FIG. 3. The elements previously discussed have the same reference numerals as in prior figures.

Plenums 54 and 55 are alternatively shown with enlongated triangular shapes and a common passage, instead of the rectangular shapes schematically shown in FIG. 1. Perforated cover plates 96 and 97 (platens) have radiused edges to give a smooth surface adjacent to belt 8.

Belt 8 may be kept tight by moving roller 7 away from roller 71. Shaft 6 of roller 7 is journaled in sliding plate 98, which translates in a recess 99 in side plate 100 and is locked in a desired position by screws 101. The same construction exists at the other end of roller 7, but is not seen in FIG. 3 because of the sectional view. The pair of plates 100 are held in spaced relationship by plural cross-members 102 and 117.

Auxiliary belt 92 passes over three roller assemblies and rides on the top of belt 8 around slightly more than half of the circumference of roller 71, as has been previously mentioned. Belt 92 has adjusting screw 103, which acts upon roller assembly 104 in an elongated slot, to tighten the belt.

Further aspects of the turn-over mechanism are shown in FIG. 4. It is seen that roller assembly 94 has a fixed central rod 105 upon which hollow cylinders are affixed. At each intervening section where (typically) the five webs comprising belt 92 ride, a caged needle bearing 106 is positioned upon the rod. Belts 92, in each instance, ride upon the outer cylinder of these bearings. The same structure is found at rollers 93 and 95, save that the diameter of the hollow cylinders does not exceed that of the needle bearings.

Deflector 107, FIG. 3, coacts with large roller 71 to assist the documents to enter second belt 8 and auxiliary belt 92.

Rod 108 extends centrally through large roller 71 and is secured in end plates 100. At each end of the rod ball bearings 109 journal the end disk of the roller for rotation. The drive for this assembly is from pulley 5 upon shaft 6 of small roller 7, FIG. 1.

In the lower part of FIG. 4 typical roller 47 is reproduced. Shaft 46 extends therethrough and is journaled at each end in ball bearings 110 and 111. These, in turn, are attached to main-frame structural angles 112 and 114.

As shown in FIG. 4, belts 8 and 10 are composed of a plurality of individual belts, say twelve. These may be caused to track in assigned lateral positions by the ridges shown, or by forming a crown on an otherwise smooth pulley at the center of each position where an individual belt is to be positioned. Typically, the belts are of a woven fabric, impregnated with a synthetic elastomer, such as neoprene.

In addition to the typical self-feed mode which characterizes this invention, an additional manual mode switch 115 is provided. This allows an operator to sit in front of photographing station 67 and place documents directly under the optical center of camera 75. A perforated plastic cover may be placed over belts 10 at that location with a thin guide at the left and the top of the proper position for photographing. The documents are turned manually, if this is required.

We now turn to the logic control electronics for actuating the mechanical elements. This aspect of the apparatus is divisable into that which controls the feed table, characterized by belts 31, that which controls the main transport, characterized by belts 10, and that which controls inverting the documents, characterized by flip-over belts 8.

Considering first the feed table logic, known state counter 130 comprises the major logic-program controller for this mechanical assembly. It, in turn, is comprised of state counter 131, such as a type 74163, data multiplexer 132, such as a 74151, and a decoder, such as a 7442. These elments are connected by an equivalent single connection, save the decoder, which accepts inputs from both the counter and the multiplexer.

State counter 130 receives information for the manipulation of belts 31 from plural sources, which arise from the presence of a document upon the feed table through the "making" of sensors electrical contacts thereon, plus operator-actuated commands arising from switches and push-buttons that are set or manipulated.

Figure 7:
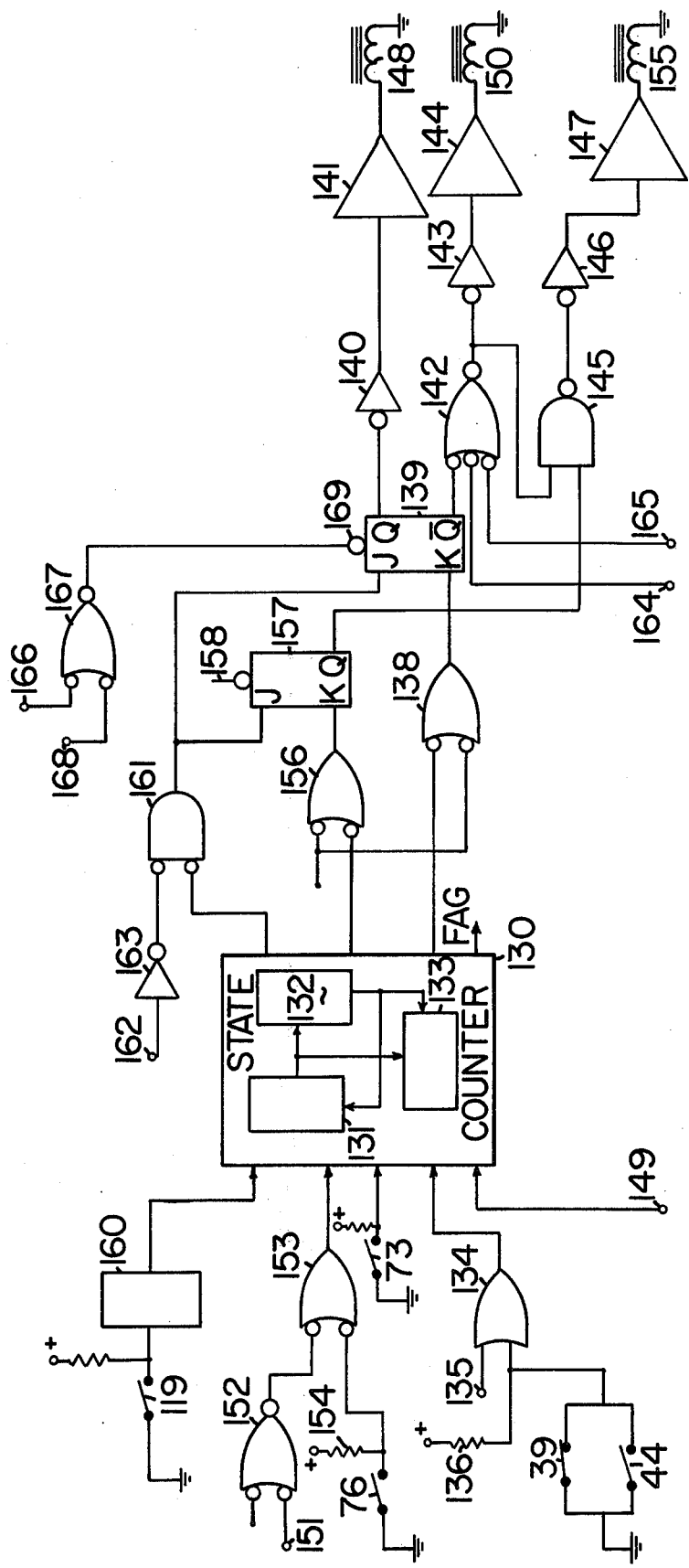
FIG. 7 is a diagram of the electronic logic control circuits for moving the documents upon the feed table.

An initial condition is that switch 39, FIGS. 5, 6 & 7 be opened. In FIG. 7 this switch is shown closed, according to the convention in logic diagrams that all switches be shown in the non-operated position. As shown in FIGS. 5 & 6, previously described, when a document is in place at the feeder table the pressure from both jets 40 and 41 is cut off and so switch 39 opens. Switch 44 is held open by the remainder of the structure (not shown) of fence 35 when it is in the full-line 35 position of FIG. 6. When the fence is in the 35' (dotted) position of FIG. 6, both switches 39 and 44 are closed, but both are opened when a document is placed in the proper aligned position by the operator. In this way a "hi" (as plus 5 volts instead of zero volts) is impressed upon OR gate 134 for the presence of any document.

These switches are ANDed into OR gate 134, along with an input from terminal 135, which carries a signal when another mode of feeding, such as from an automatic feeder (not shown), is employed. Resistor 136, connected to a source of potential such as plus 5 volts, provides an electrical response upon the closing of the switches, and vice versa.

The above described input condition having been impressed upon state counter 130, an output therefrom is entered at an input of negative NOR gate 138. The output thereof is impressed upon a set terminal of J-K flip-flop 139. This is the feeder brake control flip-flop.

The Q output of flip-flop 139 is connected to inverter 140 and thence to power amplifier 141; the output of which actuates feeder table vacuum solenoid 148 of valve 69. The power amplifier may have various configurations, but one of the Darlington type is suitable, to provide an electric current of the order of one ampere to actuate the typical solenoid valve.

The $\overline{Q}$ output of flip-flop 139 passes through negative OR gate 142, other input conditions being satisfied, and the brake part 32' of brake clutch 32 is released by solenoid 150. The gated output is inverted by inverter 143 and amplified by power amplifier 144, to release the brake.

A similar structure and function is accomplished by NAND gate 145, followed by inverter 146 and power amplifier 147 feeding into the clutch portion of clutch-brake 32, by solenoid 155. However, in actual operation the clutch is not yet actuated; a concurring input to NAND gate 145 is required.

At terminal 149 there appears an input to state counter 130, confirming that a vacuum has been established to hold the document down to the feed table. This electrical input comes from a delay counter (not shown) which was enabled when flip-flop 139 was set, as explained. This allows a "settle time", of the order of 30 milliseconds, to allow the document to surely settle down in response to the application of the vacuum.

In order that the transport of the document from the feed table be properly timed with respect to transport of previously transported documents now on the main transport, terminal 151 is connected to sensor 70 associated with flip-over belt 8; note FIG. 1. A pulse is received from this sensor when a prior document essentially leaves belt 8. This is impressed upon negative OR gate 152. The second input is from an automatic document feeder, if employed, from which pulses at an interval of say four seconds arrive.

The output of gate 152 enters negative NOR gate 153. The other input thereto is start switch 76. This switch is operator operated, as seen in FIG. 1. As before, with respect to switch 39, one terminal of the switch is grounded and the other is connected to a source of voltage through resistor 154, so that when the switch is open the output therefrom is "hi" and when it is closed it is "lo."

There are certain circumstances involving the turning over of documents by belt 8 and associated elements in which the time taken by main transport 10 is sufficient to allow the operator to place a new document in the proper loading positon before an output occurs from the document sensed as coming off of belt 8. This output is impressed at terminal 151. In this circumstance the feed table is automatically energized when the machine is ready to accept the next document and start button 76 need not be pressed. From either of these input conditions the output of gate 153 is fed into state counter 130.

The resulting response is an output to negative NOR gate 156, which then sets J-K flip-flop 157 by connection to a set terminal.

The Q output therefrom provides the required second input to the two-input NAND gate 145 previously described. Upon the next clock pulse to flip-flop 157 at terminal 158 this action is executed. Feeder clutch 32 is then energized and the document moves forward, in the direction toward main transport 10, and subsequently off of the feeder table.

This continues until the trailing edge of the document is sensed by vacuum switch 119. This sensor is located at the edge of the feed table near the main transport. The "make" of this switch enters feeder logic 160, which is comprised of two J-K flip-flops and associated gates, such as to enable this entity to sense the trailing edge of the document. The output therefrom enters state counter 130.

Therefrom, in consequence, comes an output which enters negative AND gate 161. The other input to this gate enters from an automatic feeder. If this is not used, terminal 162 is normally "hi", and by inverter 163 is made normally "lo." This enables the clear of the brake 32' control and the clutch enable flip-flop 157.

If an automatic feeder is on the line, gate 161 is inhibited, leaving feeder brake 32' released and clutch 32 enabled. In effect, this causes the feeder belt 31 to run continuously, with the feeder correlation accomplished by the feeder device.

With the feeder table, belts 31, only, the output from gate 161 is connected to, and enters, set inputs of both flip-flops 139 and 157. This results in releasing vacuum solenoid 69, clutch 32, and the application of feeder brake 32'.

The other conditions impressed upon negative OR gate 142 have to do with the progress of prior documents through the machine. At terminal 164 a signal arising from maneuvering a prior document at exposure station 67, switches 73 and 74, inhibits feed of another document from the feed table until the prior document is stationary for photographing. At terminal 165 a similar signal inhibits feed of another document while main transport 10 is in reverse for turning over a document.

If an automatic feeder is on line and is feeding documents to the feed table, should a "double document" be sensed (two documents being fed at once instead of one document), terminal 166 of FIG. 7 goes "lo". This inhibits the feed table functioning until the condition is cleared. The output of negative OR gate accordingly goes "lo". This, in turn, clears flip-flop 139. This inhibits the feed table by releasing the clutch, applying the brake and releasing the feeder vacuum. The feed table clutch 32 and brake 32' are complementary elements; both are never on at the same time.

With the circuit shown in FIG. 7 and the sequence recited above the original "at rest" conditions are restored. To start a new sequence operator 77 places another document on the feed table in the proper position against fence 35 and presses start button 76.

FIG. 8 shows the circuit for the logic control of the main transport, characterized by belts 10 of FIGS. 1 and 4.

The normal condition of the main transport is running in the forward direction; i.e., running away from feed belts 31.

In the same way as with the feed table logic of FIG. 7, state counter 171 of FIG. 8 comprises the major logic-program controller for the main transport mechanical assembly. The internal connections are the same as before.

As soon as document leaves the feed table transport, belts 31, it enters the main transport, belts 10, and is carried along with the same, typically to photographing station 67. Here the document first encounters vacuum switch 73. In FIG. 1 this is shown as an orifice and in FIG. 8 as an electrical switch; these being the physical and the electrical aspects of the same device.

Only one switch 73 has been shown, but a second one may be povided, giving an OR logic configuration in view of the normally open position of the switch. The second switch is located at the same position along the length of belts 10 as the first switch, but is spaced transversely from it by a major fraction of the width of the belts 10 structure. The second switch serves to accomplish the document sensing function in case the document should have a dog-ear such as to prevent its presence being known at the leading edge.

Upon the presence of a document, switch 73 is "made" (closed). A connection therefrom enters state counter 130 of FIG. 7, giving an FAG output therefrom, which enters as an input 172 of FIG. 8 of negative NOR gate 173. This sets J-K flip-flop 174. The $\bar{Q}$ output thereof effects the release of the forward clutch and applies the transport brake at the same time. The brake is applied for a time interval of about 30 milliseconds.

The above functioning is accomplished through a series of gates and amplifiers as follows.

Negative NAND gate 175 has one input connected to the $\bar{Q}$ output of flip-flop 174 and the other input to switch 73, now made, and reproduced in FIG. 8 as well as in FIG. 7 for tutorial convenience. Thus, an output is obtained from gate 175. This is impressed upon an input of negative NOR gate 176. An output therefrom enters inverter 177, and thereafter driver circuit 178. The driver circuit contains amplifiers to raise the power level sufficiently to drive power amplifier 179, the output from which normally energizes solenoid 180 of forward clutch 19. In the present procedure the clutch is deenergized because there is no output from amplifier 179.

Transport brake 27, having solenoid 181. FIGS. 1 and 8, respectively, is energized by another series of gates and amplifiers. An output of the forward clutch channel is taken from the connection between negative NOR gate 176 and inverter 177 and impressed upon the top input of three-input AND gate 182.

Another input to AND gate 182 is derived from reverse clutch 18 channel which terminates in reverse clutch coil 184 in FIG. 8. This is supplied at this time because the document has not made switch 74.

Another input from gate 217 is to insure that the brake is released when the document feed is in reverse.

Entity 183 is a delay counter. It provides a delay from the time that the logic conditions for a stationary document at exposure station 67 have been met and the time that camera 75 is enabled to make the exposure. This allows the document to surely become motionless, a requisite for clear photography. A 30 millisecond delay is typical.

Further as to gate 217 as an input to AND gate 182. For the photographing step brake 27, 181 is set. Assume that the first side of the document has just been photographed and that both sides are to be photographed. The next requirement is that the transport 10 be given a reverse command and that the brake simultaneously be turned off.

Switch 74 is open, thus it is in the "hi" state. It is connected through two inverters, 218 and 219 to an input of negative OR gate 217, which makes this input also "hi." Switch 73 is closed at this time because the document is sitting on it. This switch is thus "lo," but out of single inverter 216 the state is "hi." Thus, gate 217 is inhibited. The only time that this gate is active is when the document is coming forward to the switch positions 73 and 74.

Considering this latter condition, AND gate 182 is fully enabled and an output therefrom passes through inverter 185 and into a pair of logical AND gates 186 and 187, which are used as negative OR gates. The output from gate 186 triggers one-shot 188, to effect a delay of the order of 30 milliseconds. This is to accomplish the brief braking action that has previously been mentioned.

Enabled negative OR gate 187 provides an output to negative OR gate 189, which in turn provides an output to inverter 190 and power amplifier 191. The latter is connected to the brake solenoid 181, which in this instance is energized.

Despite the fact that the presence of the document at switch 73 has disengaged the forward clutch and applied for brake for 30 milliseconds the inertia of the belt-roller system will cause an overshoot of this switch. In fact, the document will progress to and slightly beyond the second switch 74. As has been mentioned, the latter switch is located typically about ½-inch farther along on the main transport than is switch 73.

As soon as switch 74 is made, reverse clutch 18, having solenoid 184, is energized. The transport system and the document now move in reverse, for the purpose of positioning the document accurately and consistently at photographing station 67.

The movement in reverse is at a much slower speed than was the forward motion of the transport, as 10 to 20 inches per second, rather than 100 inches per second. This preferred mode of operation occurs because of the functioning of tachometer 120. This known device is mechanically connected in effect to prime mover 1, of FIG. 8; though this may actually be anywhere on the main transport system that is subject to forward and reverse motion, as roller 48 in FIG. 1. The tachometer may give an output of the order of 3 volts for each 1,000 revolutions per minute.

The voltage output of tachometer is impressed upon voltage comparator 192, which may be a TI72720 integrated circuit. The second input thereto is from potentiometer 193, which is connected to a source of voltage and to ground, while the slider thereof is connected to the voltage comparator to give a threshold against which the tachometer works.

As the tachometer voltage increases due to increased backward speed of belts 10 and the rest of the main transport system, it reaches the voltage for which potentiometer 193 had been set. A "compare" is thus accomplished and reverse clutch 18, 184 is deenergized. The dynamics of the system is arranged such that this frequently occurs. This on-off energization causes the return speed to be only a fraction of the continuous forward speed that occurs in that direction.

The output from comparator 192 enters one input of negative AND gate 194, and when this gate is otherwise enabled an output proceeds to OR gate 195, thence to negative NOR gate 196, inverter 197, driver 198 and power amplifier 199, suitably energizing or deenergizing solenoid 184 of reverse clutch 18.

Power amplifiers 179 and 199 typically have a current capability of a few amperes through the respective solenoids, and may be the RCA 1000 type.

What takes place in returning the document to an equilibrium final position for photographing is that the reverse clutch is turned on and off a number of times during the return excursion of the document back from the location of switch 74 to a position between that switch and the location of switch 73. This is the final photographing position and may be nearer aperture 73 than aperture 74. The increments of the return motion are executed so rapidly and and smoothly that one cannot sense any jerk in the motion of the transport when looking at the performance of the machine.

When the return excursion of the document exposes aperture-switch 74, transport brake 27, 181 is applied and reverse clutch 18, 184 is finally released.

The foregoing processing has been according to the single side mode, in which the document is not turned over, or "flipped." The mode is established by an input at terminal 201 from a mode switch (not shown). Cascade-connected inverters 202 and 203 double invert this input, so that the phase is not reversed as a whole.

When the document is to be flipped a suitable input is provided at terminal 204 or 205 from switches on the operating console (not shown) to the inputs of negative NOR gate 206. An input to terminal 204 provides that both sides of the document will be exposed automatically. An input to terminal 205 provides that both sides of the document will be exposed only if marked with invisible ink.

After side 1 of the document has been positioned at the photographing station and presumably photographed by camera 75 according to a preselected choice, an output from state counter 171 is conveyed to an input of negative NOR gate 207; also, through inverter 208 the set input to J-K flip-flop 209 is set.

The Q output from flip-flop 209 empowers reverse drive clutch 18, 184 by providing an input to OR gate 195, with the consequent energization of that clutch through elements 196 to 199 in a manner that has been previously described.

The $\overline{Q}$ output from flip-flop 209 actuates solenoid 210 through inverter 211 and amplifier 212. This output also inhibits the forward clutch negative NOR gate 176. Solenoid 210 is associated with pressure valve 61 of a two-way vacuum-pressure valve 60–61.

Pressure is then substituted for vacuum on the main transport belts 10 at plenum 58. This raises the document, which is now returning from photographing station 67, and allows the vacuum of flip-over plenum 55 to capture it, to belts 8.

The main transport belts 10 continues in the reverse mode and belts 8 are similarly in continuous unidirectional motion until the document obscures pressure switch 70, FIG. 1 and 8. In FIG. 8 the "make" of this switch and the consequent inverted input supplied to counter 171 through inverter 214 provides an output therefrom into inverter 215 and thence to the preset terminal of J-K flip-flop 209. This output also clears flip-flop 174, thereby removing an inhibit from the forward clutch and releasing the reverse clutch. The former occurs at negative AND gate 175 and the latter from the Q output of flip-flop 209 through OR gate 195. Transport brake 27, 181 is also applied for 30 milliseconds via one-shot 188. This step decreases the turnaround time, overcoming to some degree the mechanical inertia of the system.

The main transport 10 thus resumes its normal operation, which is moving forward from feed table belts 31 to photographing station 67. This is accomplished when forward clutch 19, 180 is engaged and brake 27, 181 is released.

With the document under consideration vacuum-secured to the flipper assembly, including belts 8, which continuously move in the direction indicated by the clockwise directed arrow on roller 71 in FIG. 1, the document moves down to small roller 7. With main belts 10 now moving forward, the document is transferred from belts 8 to belts 10 without losing orientation an moves on belts 10 to photographing station 67. The same functioning as before of vacuum switches 73 and 74 positions the document correctly at the photographing station. This is now the second side of the document; however, because of the flipping operation.

A second input to OR gate 186 is also from switch 70. This input applies the brake for 30 milliseconds, as has been discussed.

Inverter 219 enables application of the brake when a document is heading for the exposure station 67 and inhibits the application of the brake when the document is moving in reverse toward the flipper, for side 2 control of the document. Inverter 216 accomplishes essentially the same function, but with respect to leading edge switch 73. The purpose of the whole gate 217 is to insure that the transport 10 does not have to "fight" the action of the brake when the transport is moving in reverse to flip the document.

A typical mode of operating the transports is to flip all documents whether or not the second side is photographed. This gives the original order and orientation for the discharged documents.

Discharge from the photographing station to tray 88 is accomplished by an output from counter 171 to the second (lower) input to negative NOR gate 207. An output therefrom sets flip-flop 174, with the $\overline{Q}$ output enabling forward motion of belts 10 through elements 175 to 180.

An additional input is impressed at terminal 220, which is connected to one input terminal of each of negative NOR gates 176 and 196, and negative AND gate 189. Typically, this terminal receives a "shutter not busy" signal from the camera logic when this is the case and so the transport logic of FIG. 8 is free to control the transports. A similar external condition may alternatively be applied, as having to do with other photographic or formal aspects. When the shutter is busy, as while photographing, transport of the document is inhibited.

A clock entity (not shown) is required for the synchronous operation of the J-K flip-flops, etc. Herein, a fundamental clock frequency of 16 kilohertz is useful, with the frequency divided down to 500 hertz for the operation of clock counter delays.

We claim:
1. The method of moving a document for stationarily exhibiting both sides thereof, which includes, in order, the steps of;
    a. planarly translating said document while flat forward over a path to an exhibiting position (67), and stopping it,
    b. planarly translating said document while flat backward from said exhibiting position over substantially the same said path,
    c. curvilinearly turning said document over while it is completing the backward translation,
    d. returning said document to said path at an inclination thereto, and
    e. again planarly translating said document while flat forward over said path to the exhibiting position, and again stopping it.

2. The method of claim 1, which includes the additional step of;
    a. subsequently planarly translating said document while flat farther forward to terminate the motion of said document.

3. The method of moving a document for stationarily exhibiting one side thereof, which includes, in order, the steps of;
    a. planarly translating said document while flat forward over a path to an exhibiting position (67), and stopping it,
    b. planarly translating said document while flat backward from said exhibiting position over substantially the same said path,
    c. curvilinearly turning said document over while it is completing the backward translation,
    d. returning said document to said path at an inclination thereto, and
    e. again planarly translating the document forward while flat, to and farther coplanarly forward than the location of said exhibiting position.

* * * * *